WEIGHT PERCENT CHANGE OF SODIUM HYDROXIDE, SODIUM CARBONATE AND ALUMINUM NITRIDE.

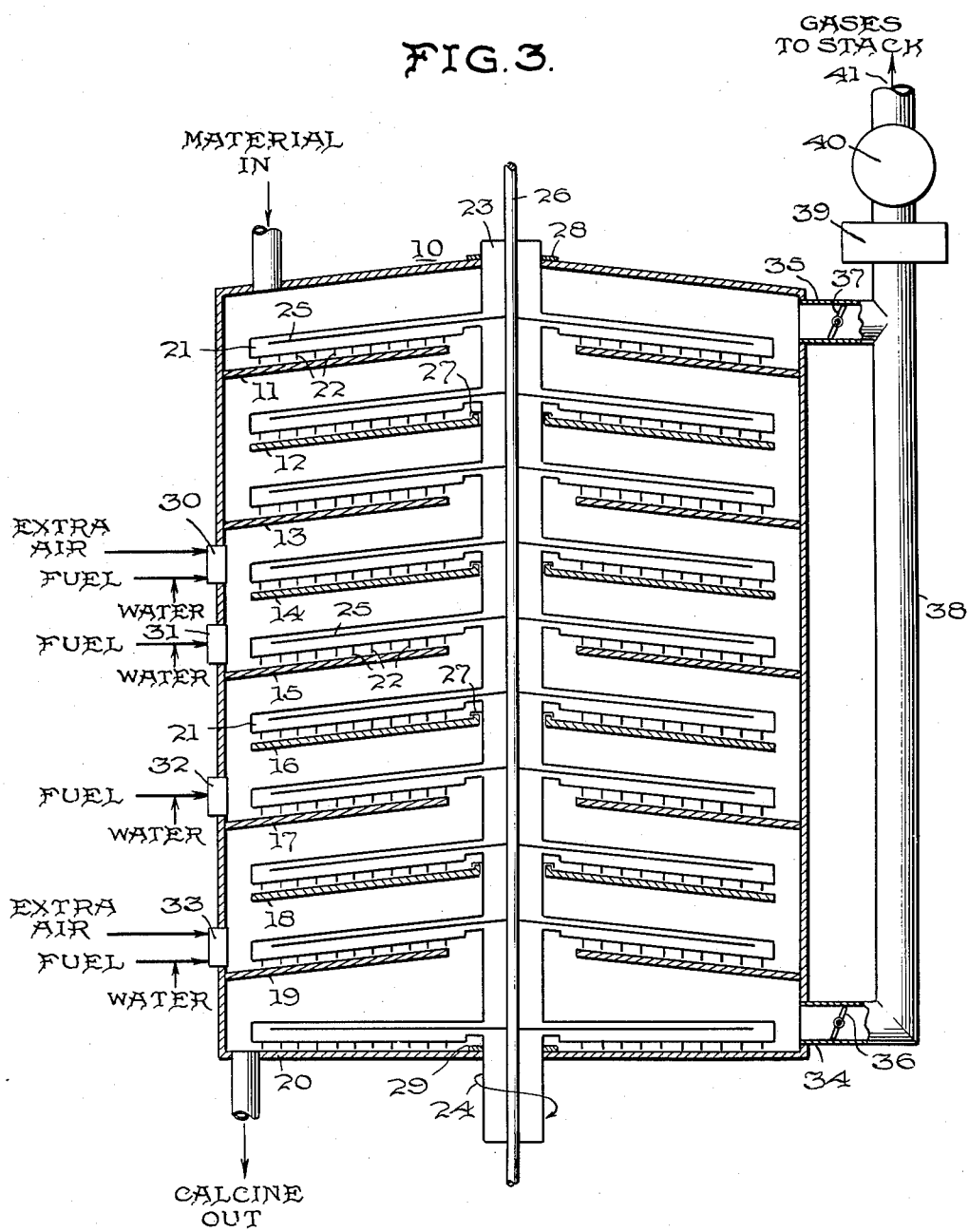

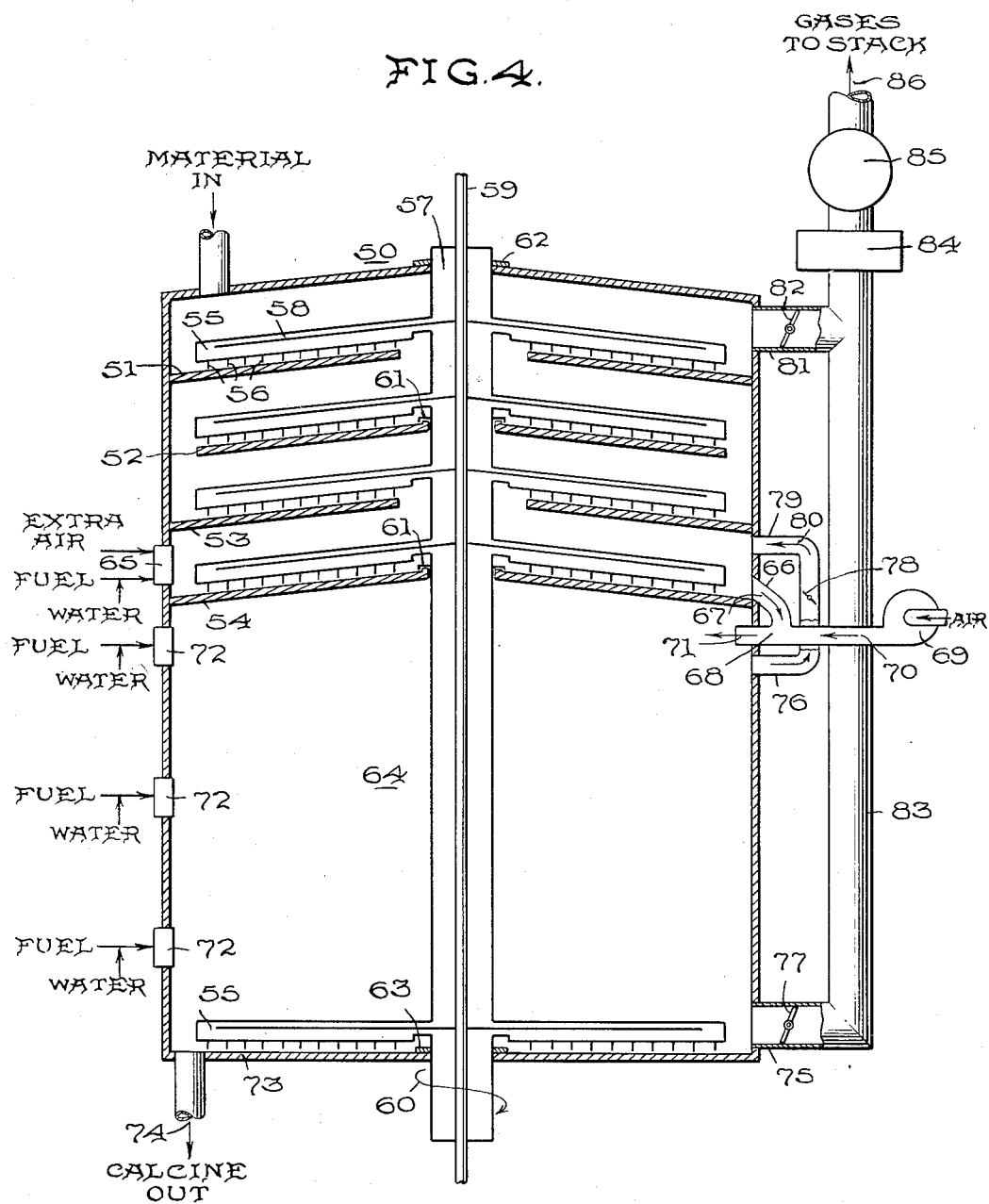

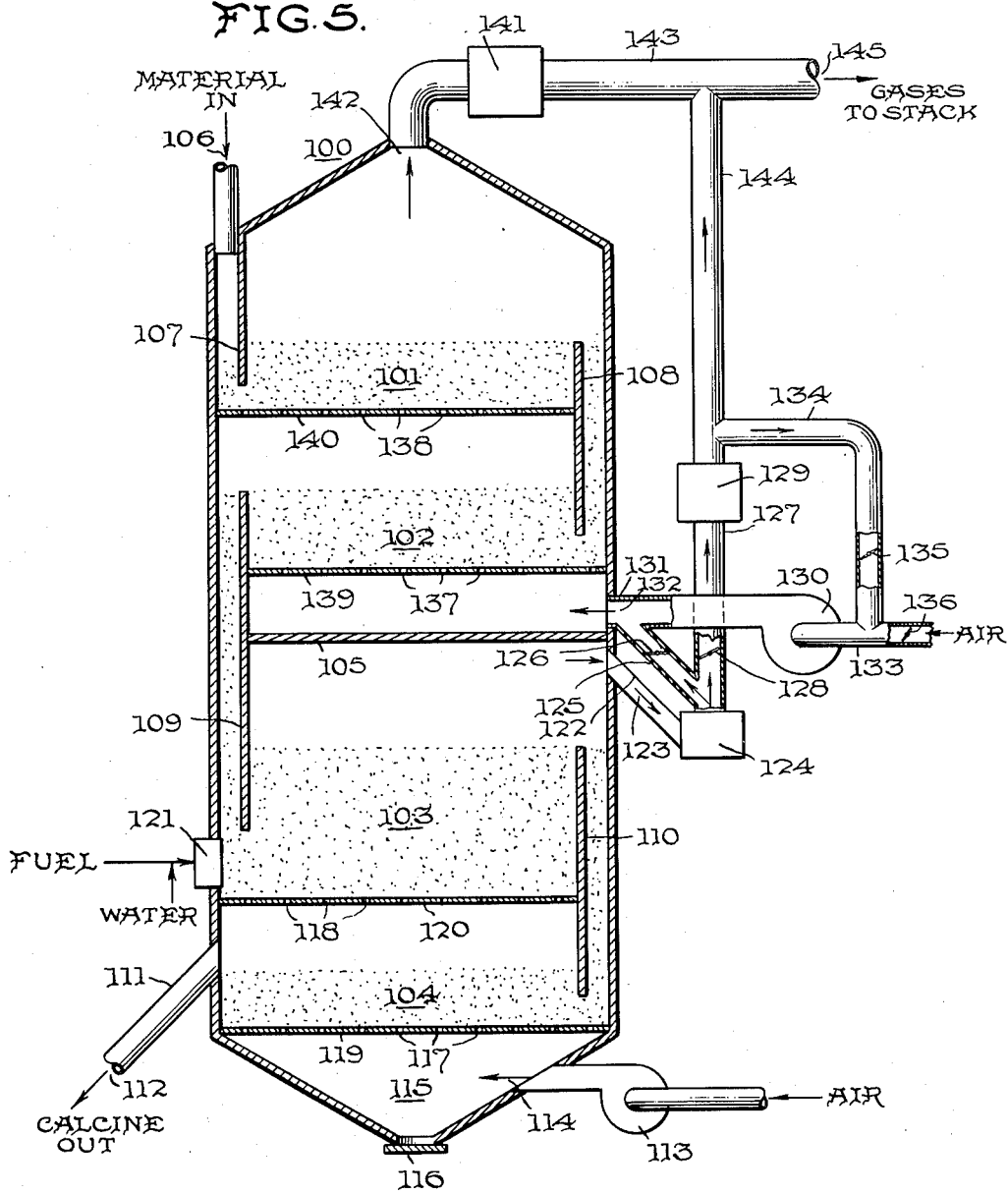

United States Patent Office 2,732,283
Patented Jan. 24, 1956

2,732,283

PROCESS OF RECOVERING CRYOLITE, ALUMINA, AND OTHER BATH VALUES

Wayne H. Clukey, Tacoma, Wash., assignor to Kaiser Aluminum & Chemical Corporation, Oakland, Calif., a corporation of Delaware Application February 24, 1953, Serial No. 338,235

34 Claims. (Cl. 23—88)

This invention relates to a method of recovering valuable constituents from a caustic containing material contaminated with carbon and other impurities, and more particularly relates to a method of reclaiming bath values such as cryolite, fluorspar, alkali and alumina from spent carbon electrodes and from cell skimmings of aluminum electrolytic reduction cells.

Heretofore the worn-out carbon linings of aluminum reduction cells were either thrown away, involving the loss of considerable amounts of cryolite, fluorspar, alkali and alumina, or were subjected to various reclaiming processes wherein only a portion and relatively small proportions of the values could be economically recovered. Since a spent lining may have absorbed one-third or more of its original weight in fused electrolyte, the loss from unrecovered values in the spent lining may be considerable. None of the previous methods of reclaiming such values have been completely successful. One method, known as the caustic leach method, involves grinding the spent lining in a caustic solution, filtering the pulp, and precipitating cryolite from solution by use of carbon dioxide, as disclosed in Morrow Patent No. 1,871,723. The principal drawback of this caustic leach method is that such method does not recover the spar and alumina values present in the spent lining. Moreover, this method is hard to control and the necessary equipment is quite expensive. Flotation methods, exemplified by Crawford Patent No. 2,183,500, have been unsuccessful in solving the problem because cryolite is soluble in the alkaline solution of caustic and alkali carbonate present in the scrap. Experimentation with roasting of the scrap to burn off the carbon has been unsuccessful because of fusion of the material below temperatures necessary for active oxidation of the carbon. Such fusion apparently causes coating of the carbon precluding further oxidation thereof.

In addition, under certain conditions of cell operation, objectionable quantities of carbon and calcium carbide accumulate on the surface of an aluminum reduction cell bath in the form of a scum. Common practice is to remove these impurities from the cell by skimming. These cell skimmings usually contain about 5% carbon and about 2% calcium carbide, the balance being bath material. Recovery and return of the values thus lost to the bath is of considerable economic importance. Efforts toward roasting of cell skimmings ground to small particle size have been unsuccessful because of fusion of the material below temperatures necessary for active oxidation of the carbon, seriously impeding further carbon removal.

It is an object of this invention to present a method of and apparatus for removing carbon from caustic containing material contaminated therewith. Another object is to present a method for the economical recovery of bath values which have been contaminated with carbon during aluminum reduction cell operation, by roasting the contaminated values in such a manner that coating of the carbon by fused caustic is prevented and effective removal of the carbon and recovery of the bath values is accomplished. It is a further object of this invention to present an efficient method for reclaiming the bath values from spent carbon linings wherein fluorspar and alumina, as well as cryolite, are reclaimed. It is yet another object of this invention to present roasting apparatus suitable for performing the disclosed method of removing carbon from carbon and caustic containing material whereby oxidation of substantially all of the carbon may be accomplished. This invention has an additional object the presentation of a method of and apparatus for expeditiously decomposing nitrides and carbides to oxides. These and other objects will be apparent from the following description.

It has been found that it is the fusion of the sodium hydroxide (formed from the alkali in the contaminated values) at temperatures above 600° F. which prevents the oxidation and removal of carbon from contaminated values and that this deleterious effect of the sodium hydroxide can be remedied by heating the contaminated values and converting the sodium hydroxide to the higher melting sodium carbonate by means of the carbon dioxide formed by the oxidation of a portion of the contained carbon at a temperature below the fusion point of the sodium hydroxide. The carbon dioxide necessary for this conversion may be supplied, in part, by combustion of hydrocarbon fuels in the event fuel-firing is utilized to calcine the material during recovery. When this conversion is complete, the temperature may then be raised or allowed to rise to a point below the melting point of the contained cryolite, yet high enough so that active oxidation of the remainder of the carbon takes place. The method requires the controlled oxidation of the carbon in suitable calcining apparatus, such as a furnace, roaster or fluidizer within which the temperature and composition of the gas may be varied under close control within well-defined limits, the amount of oxygen for combustion in the air introduced during calcining being at least sufficient to satisfy the stoichiometric requirements for combustion of the carbon present.

Of equal importance in the recovery and reuse of cryolite in contaminated bath values is the decomposition of the contained aluminum nitride and carbide, in the case of scrap cell lining, and calcium carbide in the case of cell skimmings, since these impurities produce deleterious effects when present in the cell bath in substantial quantities. One way in which this decomposition may be accomplished at the same time and in the same equipment along with the carbon removal is by adding a definite amount of water to the contaminated values prior to the roasting operation. In the case of scrap cell lining, the aluminum nitride and carbide are decomposed by the added water to form ammonia or methane, as the case may be, and alumina. In the case of cell skimmings, the calcium carbide is decomposed by the water to form calcium oxide and acetylene. As a result of the conversion of the carbide and the nitride, when present, to the oxide, the recovered bath values and contained calcium oxide may be returned to the cell, the bath remaining unaltered because the calcium oxide is changed to calcium fluoride, a constituent of the bath. If too much water is added during decomposition, a solution of the caustic results which will, when dry, form a lumpy agglomerate and form a coating over the carbon which will impede subsequent oxidation thereof. If too little water is used, all of the carbide and nitride, when present, will not be reacted.

The decomposition of the carbide and nitride, when present, is preferably accomplished, however, by passing water into the lower portion of a multi-hearth furnace of any type suitable to perform the necessary calcining operation. The water is evaporated by the hot calcine and hot gases and passed upward through the roaster along with the air stream to react with the carbide and nitride, if present, which is contained in the material being calcined. It is often desirable to preheat the water being introduced to the roasting zone, depending on the degree of cooling, brought about by heat exchange with the introduced water, which may be tolerated.

This latter method of conversion of carbide and nitride, when present, i. e. by the presence of a substantial amount of water vapor in the calcining atmosphere, is particularly advantageous because less extra equipment is required, and because by such latter method there is no possibility of formation of water hardened lumps which prevent the carbon from burning during roasting, as is the case with decomposition prior to roasting. Moreover, the amount of water added to accomplish aluminum carbide and nitride decomposition is not nearly as critical as in the first mentioned method since any slight excess of added water will be evaporated and removed in the atmosphere stream. As a matter of practice, the finely ground material will react with enough water vapor from the air to substantially reduce the proportion of carbide and nitride, when present, and the remainder of the water necessary to complete the conversion by counterflow contact with water vapor during heating may be easily determined.

The accompanying drawings will serve to illustrate the method of control of calcination conditions contemplated by the present invention and will further serve to illustrate various apparatus suitable for accomplishing such calcination.

Figure 3 is a vertical diagrammatic view including the interior arrangement of a ten hearth fuel-fired roaster, disclosing another apparatus capable of performing the disclosed method and embodying introduction of water through the fuel burners and a dual gas flow arrangement affording increased operational efficiency.

Figure 4 is a vertical diagrammatic view of the interior arrangement of a flash calciner capable of performing the disclosed method of calcination.

Figure 5 is a vertical diagrammatic view of the interior arrangement of a fluidized calciner capable of performing the disclosed method of calcination.

Figure 1:
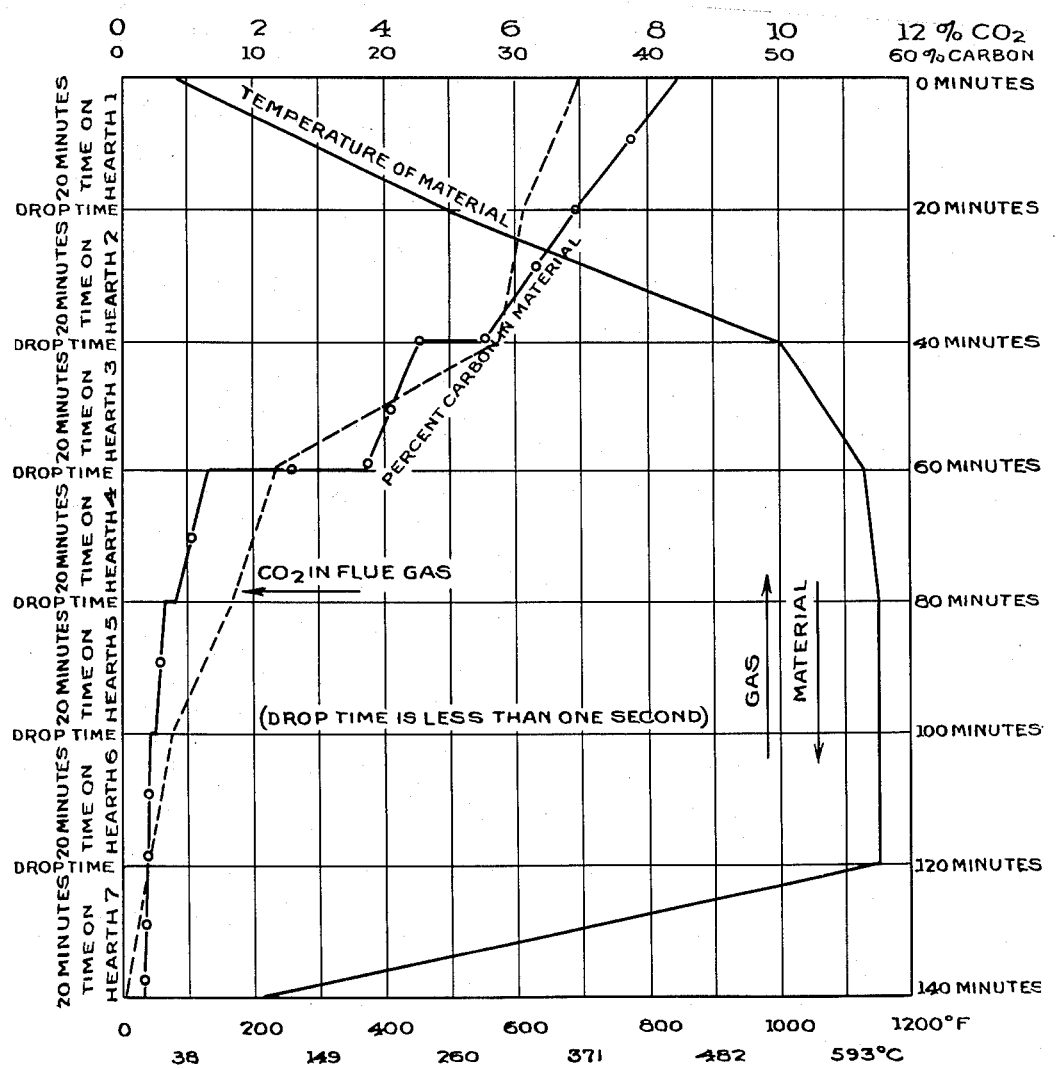
Figure 1 is a graphical presentation of changes in carbon content of the material and carbon dioxide content of the atmosphere and the material temperature when the calcination of a typical spent cell lining composition was performed in a conventional seven hearth roaster wherein the five center hearths were heated by electrical means.
Figure 2:
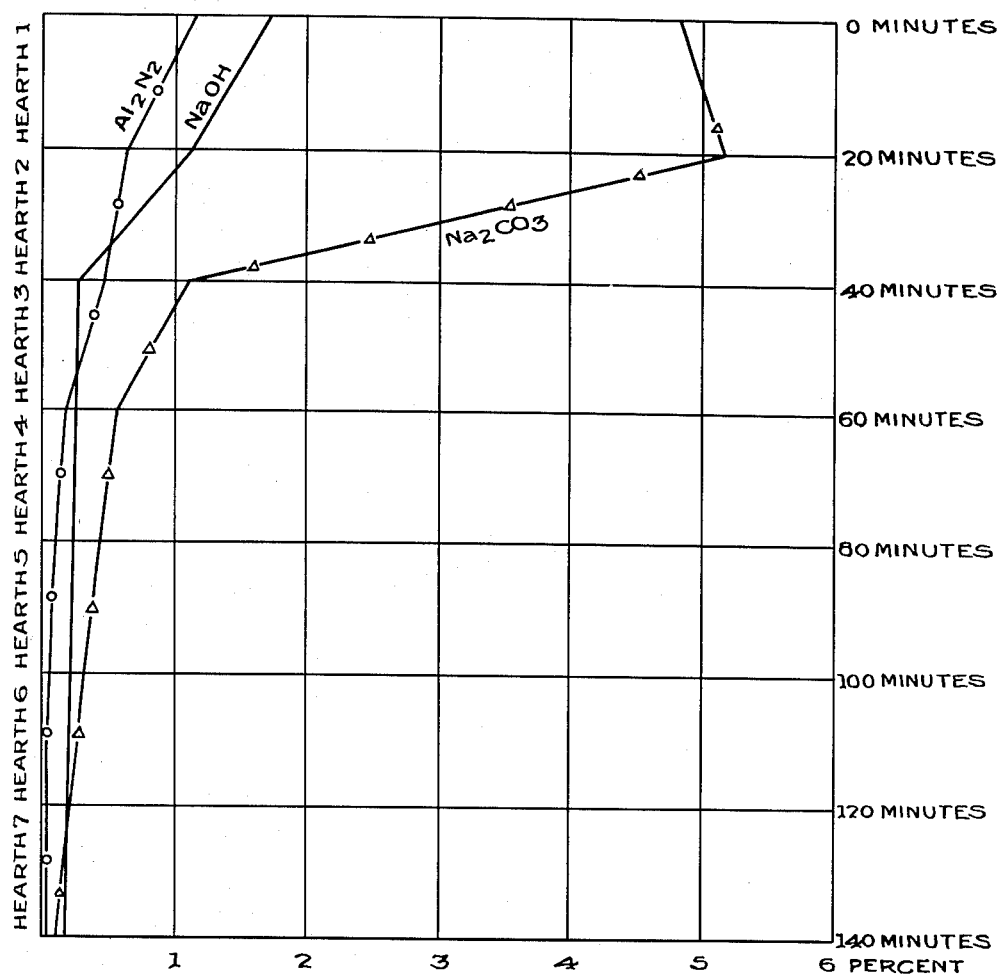
Figure 2 is a further graphical presentation of the example shown in Figure 1, showing the weight per cent changes in sodium hydroxide, sodium carbonate and aluminum nitride contents of the material at successive stages of reaction during calcination in the aforementioned seven hearth electrically heated roaster under the conditions shown in Figure 1.

Referring now to the specific example of the practice of the invention illustrated in Figures 1 and 2, an electrically heated multi-hearth roaster made up of seven superimposed horizontal hearths was employed, which utilized an air cooled central rotating shaft with radial stirring arms for rabbling the particulate material across each hearth and successively downwardly through the roaster, in a manner well known in the art. The five center hearths were heated by means of electrical heating elements mounted on the sidelining of each hearth. The top hearth served to perform a preheating function, and the bottom hearth served to cool the calcined material, which for the purpose of this example was reclaimed scrap cell lining, and further served to provide a combustion air inlet chamber and water vapor forming chamber, the water in this instance being introduced to the bottom hearth with the incoming combustion air, the water vapor thus formed being carried upwardly through the roaster in the air stream. The spent aluminum reduction cell lining material to be calcined was pulverized to a particle size small enough to pass at least 50% through 100 mesh and delivered to the top hearth where it was heated to approximately 500° F. while being rabbled across the first hearth and dropped on to the second hearth, as indicated on Figure 1. As the material was successively delivered from hearth to hearth, the temperature of the material was increased at a steady rate in the manner shown until the material reached the fifth and sixth hearths wherein a final calcining temperature of 1150° F. was reached. As the material was rabbled across the seventh hearth, it was cooled by the incoming air to approximately 225° F. before being discharged to a receiver. Travel time across each hearth was adjusted to approximately 20 minutes, making a total travel time of about 140 minutes in the seven-hearth roaster.

Figure 1 is a graphical presentation showing by solid line typical temperatures of the material in the aforementioned example as it travelled through the successive hearths of the roaster, showing by the circle-and-dash line typical percentages of carbon in the material as it passed through the roaster, and showing by the short dash line typical percentages of carbon dioxide in the flue gas at successive stages of travel.

Figure 2 graphically illustrates exemplary weight per cent changes of sodium hydroxide, sodium carbonate and aluminum nitride which occurred at successive stages of travel of the scrap cell lining through the roaster, the decrease in sodium hydroxide content being shown by the solid line, the variation in sodium carbonate content being shown by the triangle-and-dash line, and the decrease in aluminum nitride being shown by the circle-and-dash line. As will be seen by inspection of Figures 1 and 2 in this specific example the material entering the first hearth contained 42.5% carbon and was reduced to 35% in the 20 minutes' travel time across the first hearth. Very little carbon was burned in the drop from the first to the second hearth, but on the drop from the second to the third hearth the carbon was reduced from 28% to 23%. This is because the temperature of the material at the second drop was about 1000° F. which is very near the point where active oxidation of the larger carbon particles begins. During the 140 minutes that the material was in the roaster, 24.6% of the carbon was burned in less than four seconds of drop time. It will be apparent that approximately 96% of the original carbon content, approximately 90% of the original aluminum nitride content, and all of the aluminum carbide contained in the material was oxidized and reclaimed.

Figure 3 illustrates another form of multihearth roaster suitable for practice of the method disclosed herein. The multihearth roaster 10, as illustrated, employs ten superimposed hearths, 11 through 20, arranged in a conventional manner to allow successive delivery of the material being roasted in successively opposite radial directions on each successive hearth. As shown, such delivery is accomplished in a conventional manner by means of rabble arms 21, provided with rabbling blades 22, which rabble arms 21 are carried by central shaft 23, said rabble arms 21 being rotated over hearths 11 through 20 by suitable rotation of said central shaft 23 as indicated at 24. Passageways 25 are provided in rabble arms 21 which are connected with a central passageway 26 in the central shaft 23 to air cool the central shaft 23 to allow for air cooling of said shaft 23 and rabbling arms 21 during operation of the roaster, in a known manner. Central shaft 23 is also provided with lute-rings 27 which serve to bridge the gap between the hearths terminating adjacent the central shaft 23 and said shaft to prevent the material being roasted from entering therebetween. Suitable sealing means 28 and 29 and suitable support means, not shown, are provided for central shaft 23 in a manner known to the art.

The roaster modification, as illustrated in Figure 3, is fuel fired, utilizing suitable hydrocarbon fuels, such as oil or gas, by means of introduction of the fuel to suitable burner blocks 30, 31, 32 and 33 arranged to deliver heat to the areas above hearths 14, 15, 17 and 19 respectively. When the roaster is fuel fired, and nitrides and carbides are present in the caustic and carbon containing material being calcined, it has been found advantageous to introduce the water content of the calcining atmosphere with the fuel as indicated on Figure 3, this arrangement serving to provide thorough distribution of the resulting water vapor and effective conversion of the contained nitrides and carbides, and further serving to effectively control the flame temperatures of the burners and substantially eliminate volatilization of fluorine containing values during calcination. It will be understood that the air necessary for the combustion of the fuel and carbon contained in the material will be available to the burners through suitable regulation of ports conventionally provided in the roaster to accomplish the mode of operation hereinafter set forth.

The fuel firing method of calcining the caustic and carbon containing material by means of the type of roaster illustrated in Figure 3 further contemplates, in conjunction therewith, a dual or split flow of roasting atmosphere and contained combustion gases, which flow arrangement is particularly useful in the calcination of said material. Such flow arrangement contemplates, as illustrated in Figure 3, dual removal of combustion gases from the bottom hearth area, as by duct 34, as well as from the top hearth area, as by duct 35. Said ducts 34 and 35, as illustrated, are respectively provided with gas flow regulation means 36 and 37 and connected with duct 38 which in turn conveys the combustion gases to a suitable dust collector 39 and exhaust fan 40 for removal as indicated at 41.

For most efficient operation of the fuel fired roaster disclosed in Figure 3, hearth 14 is positively heated by combustion of fuel introduced to burner box 30, extra air being added as indicated to produce sufficient carbon dioxide to accomplish substantially complete conversion of the contained caustic to carbonate during the time the material travels across hearths 11, 12, 13 and 14 by counterflow of the combustion gases to duct 35. As also indicated, water is introduced with the fuel to burner box 30 to provide water vapor for conversion of contained carbides and nitrides, said water further effectively aiding in maintaining the flame temperature at a relatively low value and the consequent temperature of the material on hearths 11, 12, 13 and 14 at values not exceeding 600° F. during said conversion.

Referring now to hearths 15, 16, 17 and 18, the fuel and water introduction indicated at burner boxes 31 and 32, when properly controlled, produce a considerable carbon monoxide content in the combustion gases, the introduced water again serving to provide water vapor for additional conversion of carbides and nitrides which may be contained in the material and further serving to maintain the temperature of the material being calcined at values substantially below 1150° F. Gas flow regulation means 36 and 37 are adjusted to cause a split in the gas flow in the vicinity of hearth 14 so that the combustion gases predominating in carbon monoxide and containing water vapor from fuel and water introduced at burner boxes 31 and 32 will flow downwardly over the material being calcined on hearths 15, 16, 17 and 18. Extra air and some additional fuel and water may be introduced, as indicated, to burner box 33 adjacent hearth 19 to cause further combustion of said carbon monoxide and to raise the temperature of the material to a value on the order of 1150° F. in this area, a considerable amount of heat being supplied to the roaster by the said additional combustion, thereby reducing the fuel consumption of the roaster.

From inspection of the multihearth roaster illustrated in Figure 3, it will be apparent that a fewer or greater number of hearths than the ten illustrated may be employed so long as the essential conversion to carbonate of the caustic contained in the material being calcined at a temperature not exceeding 600° F. and so long as substantially complete removal of the contained carbon are accomplished. It will be further apparent that the fuel firing of other hearths in addition to or in lieu of such firing hearths 14, 15, 17 and 19 as illustrated is possible and may be desirable to accomplish said caustic conversion and carbon removal in a given roasting apparatus. In addition, it may in certain instances be desirable to provide the arrangement of Figure 3 with a cooling hearth or stage such as that disclosed in connection with Figures 1 and 2. Further, as disclosed in Figure 3, it will be additionally apparent that the dual or split gas flow contemplated and provided for by ducts 34 and 35 is desirable for efficient fuel consumption but not essential to utilization of a fuel fired multihearth roaster in the practice of the disclosed method. It is further contemplated that it may be found desirable to effect further economies of operation of a multihearth roaster of the type illustrated in Figure 3 by use of suitable heat exchange means associated with duct 38 or by recirculation of the hot combustion gases removed from the lower portion of the roaster to the caustic conversion upper hearths of the roaster. However, it will be apparent to those skilled in the art that a conventional fuel-fired roaster employing removal of combustion gas only from the upper portion thereof, may be satisfactorily employed in the performance of the disclosed method by suitable regulation of temperature of the hearths selected for caustic-to-carbonate conversion.

Figure 4 illustrates yet another type of calcining apparatus suitable for practice of the invention. This type of calciner generally known to the art as a flash calciner, is an adaptation of a calciner of the general type exemplified by Stimmel et al. Patent No. 1,963,282, which adaptation allows treatment of the type of material under consideration by the calcining procedure disclosed herein.

By reference to Figure 4 it will be seen that the flash calciner 50, as adapted for the process disclosed herein, embodies in its upper portion a plurality of superimposed hearths, four being indicated by way of example at 51, 52, 53 and 54. Rabble arms 55, carrying rabble blades 56, are carried by a central shaft 57 and provided with air cooling passageways 58 which are in turn connected with a central passageway 59 in a central shaft 57. Central shaft 57 is suitably rotated as indicated at 60 by conventional means, not shown, to rabble the material being calcined successively across hearths 51 through 54 in a conventional manner. Central shaft 57 is further provided with conventional lute-rings 61, suitable sealing means 62 and 63, and suitable support means, not shown, in a manner known to the art. Hearth 54 is unbroken throughout its entirety and in addition serves to form a partition between the upper or conversion stage of the calciner occupied by hearths 51 through 54 and the lower or flashing chamber 64. Hearth 54 of the conversion chamber, as illustrated, is positively fired through burner box 65 through the medium of a suitable hydrocarbon fuel such as oil or gas being introduced thereto as indicated at Figure 4, which fuel may be admixed with water as also indicated. Further, extra air may be provided so that the requisite carbon dioxide content of the combustion atmosphere in the conversion zone will be available for the requisite caustic to carbonate conversion. The amount of fuel introduced and the amount of combustion gases delivered to the conversion zone from the flashing zone, in the manner hereinafter set forth, are regulated so that the temperature of the material in the conversion zone will not exceed 600° F. Following treatment in the conversion chamber, the material being processed is raked out of the conversion chamber at hearth 54 through suitable conduit means 66 as indicated at 67 to material inlet conduit 68 which is in turn delivered a forced draft from blower 69 as indicated at 70 to impart to the material a substantial velocity as it is introduced to flashing chamber 64 as indicated at 71. Flashing chamber 64 may be fuel fired through suitably arranged burner boxes 72 which are advantageously tangentially arranged with respect to the flashing chamber 64 in a known manner to impart to the gases and material contained therein a circulatory motion. Further, it is likewise understood in the art that material inlet conduit 68 is advantageously tangentially arranged to impart to the material introduced through conduit 68 a circulatory or spiral motion as said material is subjected to the relatively higher temperatures of the flash calcining chamber 64. Fuel, water and air for combustion inputs are regulated to maintain the material temperature in the flash calcining chamber 64 at a temperature not exceeding 1150° F. when the material being flash calcined contains substantial fluoride values, and further regulated to substantially completely oxidize the carbon contained in the material with maximum fuel efficiency. After the material has been calcined in the flash calcining chamber 64 and has fallen to hearth 73, such material is rabbled across said hearth 73 by rabble arms 55 associated therewith and discharged through suitable outlet means as indicated at 74. The calcining atmosphere from flash calcining chamber 64 may be removed from said chamber by duct means 75 and 76 which are respectively associated with flow regulation means 77 and 78, provision being made for that portion of the combustion gases from flash calcining chamber 64 which is removed through conduit 76 to be delivered to the conversion zone by conduit 79 as indicated at 80 to provide a considerable portion of the carbon dioxide and heat necessary for the caustic to carbonate conversion achieved in the upper portion of the calciner. Combustion gases removed through conduit 75 from the flash calcining chamber 64 and through conduit 81 as regulated by suitable regulation means 82 are delivered through a common duct 83 to a suitable dust collection means 84, such delivery being aided by exhaust fan 85, for removal of said gases from the system as indicated at 86. By virtue of the intimate contact between the calcining atmosphere and the freely falling material in the flash calcining chamber 64, a very satisfactory burning of the carbon contained in the material is achieved in a minimum time.

It will be apparent that a fewer or greater number of conversion hearths 51 through 54 may be employed than are specifically disclosed in Figure 4, so long as the caustic to carbonate conversion essential to the disclosed process is accomplished. It will be further apparent that suitable recovery of heat from the hot gases drawn off by duct 75, as by a heat exchanger, not shown, in conjunction with conduit 83, may be desirable for efficient operation. Further, in some instances it may be possible to dispense with positive heating, i. e. burner box 65, for the conversion chamber and rely solely on flashing chamber gases delivered through conduit 79 to provide the requisite carbon dioxide and heat for the caustic to carbonate conversion. Similarly, the number of burner boxes 72 may obviously be varied as desired.

Figure 5 illustrates an additional form of calcining apparatus suitably adapted to practice of the method disclosed herein. As illustrated in Figure 5, a fluidized calciner 100 may be provided with chambers accommodating conversion beds 101 and 102, calcining bed 103 and cooling bed 104. In the arrangement of fluidized calciner 100 shown, a solid partition 105 is provided between the conversion chamber 102 and calcining chamber 103. The material to be calcined is introduced to bed 101 by suitable means as indicated at 106, which input utilizes a suitable baffle means or conduit 107 to deliver the incoming material below the surface of the bed 101 in a conventional manner. Delivery of the material from bed 101 to 102 is likewise accomplished by a suitable conduit 108, conduit means 109 and 110 further being utilized to deliver the material successively from bed 102 to bed 103 and bed 103 to bed 104. During operation of the fluidized calciner 100, as the material travels in a fluidized state across cooling bed 104, it is removed from the fluidized calciner 100 by suitable conduit means 111 as indicated 112. The material present in beds 103 and 104 is maintained in a fluidized state by introduction of air delivered by blower 113, as indicated at 114, to air box 115, the latter being provided with a suitable cleaning device 116 in a known manner. The air so introduced to air box 115 proceeds therefrom successively through beds 104 and 103 by means of apertures 117 and 118 provided in base plates 119 and 120 of cooling bed 104 and calcining bed 103, respectively. The area occupied by the material in calcining bed 103 is suitably heated, as by fuel firing through burner box 121, water being admixed with the fuel if desired, as indicated. Fluidizing gas emerging from calcining bed 103 is removed from calcining bed 103 through suitable conduit means 122 as indicated at 123 to a dust collector 124, and a portion of the gases emerging from dust collector 124 is returned to the calciner 100 below conversion bed 102 through conduit 125, in turn provided with suitable flow regulation means 126, another portion of the gases from dust collector 124 being delivered through conduit 127, provided with flow regulation means 128, to heat exchanger 129. That portion of the gases which is returned to the fluidized calciner 100 through conduit 125 is admixed with air delivered by blower 13 through conduit 131 as indicated at 132. Provision is further made to deliver a portion of the cooled gases emerging from heat exchanger 129 to inlet 133 of blower 130 through conduit 134, which is in turn provided with flow regulation means 135. Inlet 133 of blower 130 also embodies flow regulation means 136, arranged to regulate the volume of air intake, as indicated.

Referring now to the conversion chamber comprised of conversion beds 101 and 102, the fluidizing gases introduced through conduit 131 to the area below conversion bed 102 passes successively upwardly through apertures 137 and 138 provided in base plates 139 and 140 associated with conversion beds 102 and 101, respectively, the fluidizing gases emerging from conversion bed 101 being delivered to a dust collector 141 as indicated at 142 and thereafter withdrawn from the system through suitable conduit 143 which may if desired be joined with conduit 144, in turn serving to withdraw a portion of the cooled gases from heat exchanger 129 for delivery to suitable outlet means as indicated at 145.

In accordance with the disclosed process, use of the fluidized calciner 100 as illustrated in Figure 5 requires that the temperature of the material being calcined shall not exceed 600° F. in conversion beds 101 and 102 and shall not exceed 1150° F. in calcining bed 103 if substantial fluoride values are present in the material. It will of course be understood by those skilled in the art that gas delivered by blower 113 will be at the rate sufficient to maintain the material in beds 103 and 104 in a fluidized state. Similarly the volume and temperature of the gases delivered to the area below conversion bed 102 are regulated so as to maintain beds 101 and 102 in a fluidized state and so as to maintain the temperature of the material in these beds at a value not exceeding 600° F. Such regulation is accomplished in the arrangement illustrated by correlative adjustment of flow regulation means 126, 135 and 136 which respectively control the volume of hot carbon dioxide containing gases, the volume of cooled carbon dioxide containing gases, and the volume of cool air introduced to the conversion beds through conduit 131. By suitable regulation of said flow regulation means 125, 135 and 136, the desired carbon dioxide content and the desired heat content in the fluidizing gases introduced to the conversion beds to accomplish the indicated operating conditions may be obtained.

The fluidized calciner arrangement illustrated in Figure 5 is considered to present the most efficient apparatus for performing the disclosed method by fluidized calcination. However, it is contemplated that a single or a greater number of conversion beds 101 and 102 may be employed other than the two illustrated, that a plurality of calcining beds 103 may be employed if so desired and that cooling bed 104 may be omitted in certain applications. It is further contemplated that a conventional fluidized calcining apparatus embodying a calcining chamber and several superimposed preheating or conversion compartments, such as four or five for example, would be satisfactory for the performance of the disclosed process if the heat input and fluidizing gas flow are regulated so that the temperature of the material in the successive preheating or conversion compartments does not exceed approximately 600° F. prior to conversion of the contained caustic to carbonate. Such arrangement would conveniently utilize loss of heat by radiation from the compartment walls to overcome any tendency for excessive temperatures in the preheating or conversion compartments.

It will be apparent that the above examples constitute specific embodiments of the invention, and various modifications may be employed without departing from the scope thereof. Other types of roasting or calcining apparatus may be employed as long as the requisite heating and reaction sequence is maintained. Though the examples disclose a continuous roasting process, it will be apparent that a batch process embodying the requisite heating conditions may be employed. Also, the various heating steps of the disclosed process could be performed in separate apparatus if expedient. Similarly, a given total heating time may be shortened or lengthened as desired depending on the amount of carbon which may be tolerated in the resulting calcine. It is considered that somewhat less than 2.0% carbon is optimum in this regard since to obtain carbon content of 1% or less requires further heating at the maximum oxidation temperature for substantially greater lengths of time. For example, calcination for an additional 60 minutes was necessary to obtain less than 1% carbon in the example illustrated in Figures 1 and 2.

A maximum roasting temperature of about 1150° F. was selected for the example of the practice of the invention illustrated in Figures 1 and 2 for most efficient recovery of fluorine containing values, for the reason that above this temperature, in this as well as the other examples illustrated, there is a tendency for certain contained fluorides to decompose and cause some loss of fluoride by volatilization. Moreover, excessive roasting temperatures may cause a tendency for some of the contained fluorides to fuse thereby impeding the movement of the material through the roaster. For example, where too high a roasting temperature is used some of the relatively small carbon particles may tend to burn producing localized areas of high heat causing volatilization and/or fusion of certain contained fluorides, such as sodium fluoride. It has been found in many instances, however, particularly when the contained fluoride content of the material is relatively low, that a maximum roasting temperature as high as about 1300° F. is permissible without encountering excessive fusion of the contained fluoride values and without causing undue loss of fluorides by volatilization. Generally, the maximum permissible roasting temperature for carbon oxidation will be somewhat less than and determined by the temperature at which fusion and/or volatilization of contained values impede or prevent efficient recovery of such values.

In the practice of the invention wherein the caustic and carbon containing material is spent cell linings or cell skimmings from aluminum reduction cells, the material after calcination contains excess alkali and requires the addition of aluminum fluoride to form cryolite therefrom for return of the values to the reduction cell. The aluminum fluoride may be added directly to the reduction cell bath as required to adjust the alkali ratio or may be admixed with the calcine. Admixture in a ratio of about 4 to 1 (calcine to fluoride) in the case where the calcine is reclaimed from spent cell linings, will accomplish the required alkali ratio adjustment, for example.

It will be further apparent that the principle of removal of carbon from carbon and caustic containing material by conversion of the caustic to carbonate followed by oxidation of the contained carbon, as well as the principle of carbide and nitride conversion at elevated temperatures, may be used advantageously in the recovery or reclamation of inorganic values other than those derived from aluminous materials as well as from aluminous materials from other sources.

This application is a continuation-in-part of application S. N. 212,320, filed February 23, 1951, and now forfeited.

What is claimed is:

1. A method of recovering cryolite, alumina, and other bath values which have become contaminated with carbon during aluminum reduction cell operation which comprises the steps of preheating the contaminated values in particulate form at a temperature below the fusion point of sodium hydroxide and in contact with carbon dioxide gas for a time sufficient to convert substantially all the contained sodium hydroxide to sodium carbonate, and subsequently heating the contaminated values at a temperature sufficient to cause oxidation and removal of substantially all of the carbon.

2. A method of recovering cryolite, alumina and other bath values from spent carbon lining of aluminum reduction cells comprising the steps of preheating the spent lining in particulate form at a temperature below the fusion point of sodium hydroxide and in contact with carbon dioxide gas for a time sufficient to convert substantially all of the contained sodium hydroxide to sodium carbonate, and subsequently heating the spent lining at a temperature sufficient to cause oxidation and removal of substantially all of the contained carbon.

3. A method of recovering cryolite, alumina and other bath values which have become contaminated with carbon during aluminum reduction cell operation comprising the steps of reducing the contaminated material to small particle size, preheating the particles to a temperature less than about 600° F. in contact with carbon dioxide gas for a time sufficient to convert substantially all of the contained sodium hydroxide to sodium carbonate, subsequently heating the particles at higher temperatures not exceeding about 1150° F. for a period sufficient to oxidize and remove substantially all of the contained carbon.

4. A method of recovering cryolite, alumina and other bath values from spent carbon lining of aluminum reduction cells comprising the steps of reducing spent lining to small particle size, preheating the particles to a temperature less than about 600° F. in contact with carbon dioxide gas for a time sufficient to convert substantially all of the contained sodium hydroxide to sodium carbonate, subsequently heating the particles at higher temperatures not exceeding about 1150° F. for a period sufficient to oxidize and removes substantially all of the contained carbon.

5. A method of recovering alumina and other bath values from aluminum reduction cell skimmings which comprises the steps of reducing the cell skimmings to small particle size, preheating the particles to a temperature less than about 600° F. in contact with carbon dioxide gas for a time sufficient to convert substantially all of the contained sodium hydroxide to sodium carbonate, subsequently heating the particles at higher temperatures not exceeding about 1150° F. for a period sufficient to oxidize and remove substantially all of the contained carbon.

6. A method of recovering cryolite, alumina and other bath values which have become contaminated with carbon during aluminum reduction cell operation which comprises the steps of grinding the contaminated material to small particle size, preheating the particles at a temperature somewhat less than 600° F. in contact with carbon dioxide gas for a time sufficient to convert substantially all of the contained caustic to carbonate, and subsequently heating the particles at higher temperatures not exceeding about 1150° F. for a period sufficient to oxidize and remove substantially all of the contained carbon, said particles being heated in the presence of water vapor to convert any nitrides and carbides present to oxides.

7. A method of recovering cryolite, alumina and other bath values from spent carbon lining of aluminum reduction cells comprising the steps of grinding spent lining to small particle size, preheating the particles at a temperature somewhat less than 600° F. in contact with carbon dioxide gas for a time sufficient to convert substantially all of the contained caustic to carbonate, and subsequently heating the particles at higher temperatures not exceeding about 1150° F. for a period sufficient to oxidize and remove substantially all of the contained carbon, said particles being heated in the presence of water vapor to convert any nitrides and carbides present to oxides.

8. A method of recovering alumina and other bath values from aluminum reduction cell skimmings which comprises the steps of grinding the cell skimmings to small particle size, preheating the particles at a temperature somewhat less than 600° F. in contact with carbon dioxide gas for a time sufficient to convert substantially all of the contained caustic to carbonate, and subsequently heating the particles at higher temperatures not exceeding about 1150° F. for a period sufficient to oxidize and remove substantially all of the contained carbon, said particles being heated in the presence of water vapor to convert any nitrides and carbides present to oxides.

9. A method of recovering cryolite, alumina and other bath values which have become contaminated with carbon during aluminum reduction cell operation which comprises the steps of grinding the contaminated material to a particle size which will pass at least 50% through 100 mesh screen, preheating the particles at a temperature somewhat less than 600° F. in contact with carbon dioxide gas for a time sufficient to convert substantially all of the contained sodium hydroxide to sodium carbonate and subsequently heating the particles at higher temperatures not exceeding about 1150° F. for a period sufficient to oxidize and remove substantially all of the contained carbon, said particles being heated in the presence of water vapor to convert any nitrides and carbides present to oxides, and reacting the resulting calcine with aluminum fluoride to neutralize excess alkali and form cryolite.

10. A method of recovering cryolite, alumina and other bath values from spent carbon lining of aluminum reduction cells comprising the steps of grinding the spent lining to a particle size which will pass at least 50% through 100 mesh screen, preheating the particles at a temperature somewhat less than 600° F. in contact with carbon dioxide gas for a time sufficient to convert substantially all of the contained sodium hydroxide to sodium carbonate, and subsequently heating the particles at higher temperatures not exceeding about 1150° F. for a period sufficient to oxidize and remove substantially all of the contained carbon, said particles being heated in the presence of water vapor to convert contained aluminum nitride and aluminum carbide to alumina, and reacting the resulting calcine with aluminum fluoride to neutralize excess alkali and form cryolite.

11. A method of recovering alumina and other bath values from aluminum reduction cell skimmings which comprises the steps of grinding the cell skimmings to a particle size which will pass at least 50% through 100 mesh screen, preheating the particles at a temperature somewhat less than 600° F. in contact with carbon dioxide gas for a time sufficient to convert substantially all of the contained sodium hydroxide to sodium carbonate, and subsequently heating the particles at higher temperatures not exceeding about 1150° F. for a period sufficient to oxidize and remove substantially all of the contained carbon, said particles being heated in the presence of water vapor to convert contained calcium carbide to calcium oxide, and reacting the resulting calcine with aluminum fluoride to neutralize excess alkali.

12. A method of recovering cryolite, alumina and other bath values which have become contaminated with carbon during aluminum reduction cell operation which comprises the steps of grinding the contaminated material to small particle size, preheating the particles at a temperature of approximately 500° F. for approximately one-half hour to convert the sodium hydroxide present to higher melting sodium carbonate with carbon dioxide formed by oxidation of a portion of the contained carbon, heating the particles at a temperature of approximately 1000° F. for approximately one-half hour to drive off most of the carbon in the mixture as carbon oxides, finally heating the particles at a temperature of approximately 1150° F. for a period sufficient to reduce the carbon content to less than 2.0%, and cooling the mixture to approximately 225° F., said particles being heated in the presence of water vapor to convert any nitrides and carbides present to oxides.

13. A method of recovering alumina values from scrap potlining from the Hall electrolytic reduction process which comprises the steps of grinding the scrap potlining to small particle size, preheating the particles at a temperature of approximately 500° F. for approximately one-half hour to convert the sodium hydroxide present to higher melting sodium carbonate with carbon dioxide formed by oxidation of a portion of the contained carbon, heating the particles at a temperature of approximately 1000° F. for approximately one-half hour to drive off most of the carbon in the mixture as carbon oxides, finally heating the particles at a temperature of approximately 1150° F. for a period sufficient to reduce the carbon content to less than 2.0%, and cooling the mixture to approximately 225° F., said particles being heated in the presence of water vapor to convert contained aluminum nitride and aluminum carbide to alumina.

14. A method of recovering alumina and other bath values from aluminum reduction cell skimmings which comprises the steps of grinding the cell skimmings to small particle size, preheating the particles at a temperature of approximately 500° F. for approximately one-half hour to convert the sodium hydroxide present to higher melting sodium carbonate with carbon dioxide formed by oxidation of a portion of the contained carbon, heating the particles at a temperature of approximately 1000° F. for approximately one-half hour to drive off most of the carbon in the mixture as carbon oxides, finally heating the particles at a temperature of approximately 1150° F. for a period sufficient to reduce the carbon content to less than 2.0%, and cooling the mixture to approximately 225° F., said particles being heated in the presence of water vapor to convert contained calcium carbide to calcium oxide.

15. A method of recovering cryolite, alumina and other bath values which have become contaminated with carbon during aluminum reduction cell operation which comprises the steps of grinding the contaminated material to small particle size, admixing water with the ground material in amount only sufficient to decompose substantially all of any nitrides and carbides present, preheating the particles at a temperature somewhat less than 600° F. in contact with carbon dioxide gas for a time sufficient to convert substantially all the contained sodium hydroxide to sodium carbonate, and subsequently heating the particles at higher temperatures not exceeding 1150° F. for a period sufficient to oxidize substantially all of the contained carbon.

16. A method of recovering alumina values from spent carbon lining of aluminum reduction cells comprising the steps of grinding the scrap potlining to pass at least 50% through 100 mesh screen, admixing water with the ground spent carbon lining in amount only sufficient to react with contained aluminum nitride and aluminum carbide, preheating the particles at a temperature somewhat less than 600° F. in contact with carbon dioxide gas for a time sufficient to convert substantially all the contained sodium hydroxide to sodium carbonate, and subsequently heating the particles at higher temperatures not exceeding 1150° F. for a period sufficient to oxidize substantially all the contained carbon.

17. A method of recovering alumina and other bath values from aluminum reduction cell skimmings which comprises the steps of grinding the cell skimmings to small particle size, admixing water with the ground cell skimmings in amount only sufficient to react with substantially all of the calcium carbide contained therein, preheating the particles at a temperature somewhat less than 600° F. in contact with carbon dioxide gas for a time sufficient to convert substantially all the contained sodium hydroxide to sodium carbonate, and subsequently heating the particles at higher temperatures not exceeding 1150° F. for a period sufficient to oxidize substantially all the contained carbon.

18. A method of recovering cryolite, alumina and other bath values which have become contaminated with carbon during aluminum reduction cell operation which comprises the steps of grinding the contaminated material to small particle size, preheating the material at a temperature of approximately 500° F. for a period sufficient to convert the caustic present to a higher melting carbonate with the carbon dioxide formed by oxidation of a portion of the contained carbon, heating the material at a temperature of approximately 1000° F. for a period sufficient to drive off most of the carbon in the mixture as carbon oxides, finally heating the material at a temperature of approximately 1150° F. for a period sufficient to reduce the carbon content to less than 2.0%, and cooling the material.

19. In the operation of a multihearth roaster for recovery of cryolite, alumina and other bath values from material contaminated with carbon during aluminum reduction cell operation, the method which comprises roasting the contaminated material in particulate form in contact with carbon dioxide containing gas in the upper portion of said roaster at a temperature below the fusion point of the caustic contained in said material for a period sufficient to convert substantially all of the contained caustic to carbonate, and subsequently roasting said material in the lower portion in said roaster at higher temperatures not exceeding the fusion temperature of contained fluorides for a period sufficient to remove substantially all of the carbon contained in said material.

20. The method according to claim 19, which further comprises heating a plurality of the intermediate hearths of said roaster electrically.

21. The method according to claim 19, which further comprises introducing water vapor to the bottom portion of said roaster and counterflowing said water vapor upwardly through the roaster with the roasting atmosphere to cause conversion of any nitrides and carbides present in said material to oxides.

22. In the operation of a multihearth roaster, of the type wherein a plurality of the intermediate hearths of the roaster are heated by combustion of hydrocarbon fuel, for recovery of cryolite, alumina and other bath values from material contaminated with carbon during aluminum reduction cell operation, the method which comprises roasting the contaminated material in particulate form in contact with carbon dioxide containing gas in the upper portion of said roaster at a temperature below the fusion point of the caustic contained in said material for a period sufficient to convert substantially all of the contained caustic to carbonate, and subsequently roasting said material in the lower portion of said roaster at higher temperatures not exceeding the fusion temperature of contained fluorides for a period sufficient to remove substantially all of the carbon contained in said material.

23. The method according to claim 22, which further comprises flowing at least a portion of the combustion gases generated in the upper portion of the roaster upwardly through said upper portion of the roaster, withdrawing said portion of the combustion gases from the upper portion of the roaster and withdrawing the remaining portion of the combustion gases generated in the roaster from the lower portion of the roaster.

24. The method according to claim 22, which further comprises introducing water to at least one of the hydrocarbon fuel combustion zones to provide water vapor to cause conversion to oxides of any nitrides and carbides contained in the material and to aid in effectively controlling the combustion temperature of said fuel.

25. The method according to claim 23, which further comprises regulating the combustion of fuel introduced in the lower portion of said roaster to produce substantial amounts of carbon monoxide in the combustion gases surrounding the central hearths of said roaster and to provide substantially lesser amounts of carbon monoxide in said combustion gases as they are withdrawn from the lower portion of the roaster.

26. In the operation of a flash calciner, of the type having a multihearth upper heating zone and a lower flashing zone, for recovery of cryolite, alumina and other bath values from material contaminated with carbon during aluminum reduction cell operation, the method which comprises introducing the contaminated material in particulate form to said upper zone of said flash calciner, heating said material in said upper zone in contact with carbon dioxide gas at a temperature below the fusion point of contained caustic for a period sufficient to convert substantially all of the contained caustic to carbonate, removing said material from said upper zone, introducing said material to said flashing zone, and flash calcining said material in said flashing zone at higher temperatures not exceeding the fusion temperature of contained fluorides to remove substantially all of the carbon contained in said material.

27. The method according to claim 26, which further comprises utilizing at least a portion of the carbon dioxide containing gas generated by combustion of carbon contained in said material in said flashing zone to furnish at least a portion of the carbon dioxide gas necessary for conversion to carbonate of caustic contained in said material in said upper heating zone.

28. The method according to claim 26, which further comprises heating said upper zone and said flashing zone by combustion of hydrocarbon fuel therein, and introducing water to at least one of said combustion zones to provide water vapor for conversion of any nitrides and carbides present in said material to oxides.

29. In the operation of fluidized calcining apparatus, of the type having a preheating zone comprising at least one preheating fluidized bed and having a calcining zone comprising at least one calcining fluidized bed, for recovery of cryolite, alumina and other bath values from material contaminated with carbon during aluminum reduction cell operation, the method which comprises fluidizing the contaminated material in particulate form in said preheating zone at a temperature below the fusion point of contained caustic while said material is in contact with carbon dioxide containing gas for a period sufficient to cause conversion of substantially all of the caustic contained in said material to carbonate, and subsequently fluidizing said material in said calcining zone at a temperature not exceeding the fusion temperature of contained fluorides for a period sufficient to remove substantially all of the carbon contained in said material.

30. The method according to claim 29, which further comprises heating said calcining zone by combustion of hydrocarbon fuel therein, and introducing at least a portion of the carbon dioxide containing gas generated in said calcining zone to said preheating zone.

31. The method according to claim 29, which further comprises cooling said material after removal of contained carbon by transfer of heat therefrom to a fluidizing atmosphere and fluidizing said material in said calcining zone with the atmosphere so heated.

32. The method according to claim 30, which further comprises introducing water into the hydrocarbon fuel zone to provide water vapor for conversion of any nitrides and carbides present in said material to oxides.

33. The method according to claim 30, which further comprises withdrawing the carbon dioxide containing gas emerging from said calcining zone, removing at least a portion of the dust particles entrained therein, cooling at least a portion of said gas, thereafter introducing at least a portion of said gas to said preheating zone, and utilizing said latter portion of said gas to aid in fluidizing said material in said preheating zone.

34. The method according to claim 33 which further comprises introducing to said preheating zone additional air with said carbon dioxide containing gas to aid in effectively maintaining the caustic containing contaminated material therein at a temperature below the fusion point of the contained caustic.

References Cited in the file of this patent

UNITED STATES PATENTS

| | | |
|---|---|---|
| Re. 19,240 | Goodell | Oct. 28, 1932 |
| 1,129,505 | Peacock | Feb. 23, 1915 |
| 1,137,779 | Moore | May 4, 1915 |
| 1,871,723 | Morrow | Aug. 16, 1932 |
| 1,931,536 | Goodell | Oct. 24, 1933 |
| 2,036,213 | Hambly | Apr. 7, 1936 |
| 2,163,466 | Opatowski | June 20, 1939 |
| 2,261,995 | Greenawalt | Nov. 11, 1941 |
| 2,536,099 | Schleicher | Jan. 2, 1951 |